Re 5874
5-12-1874
W. C. WREN & W. BARKER.
Manufacture of Gas
5,874
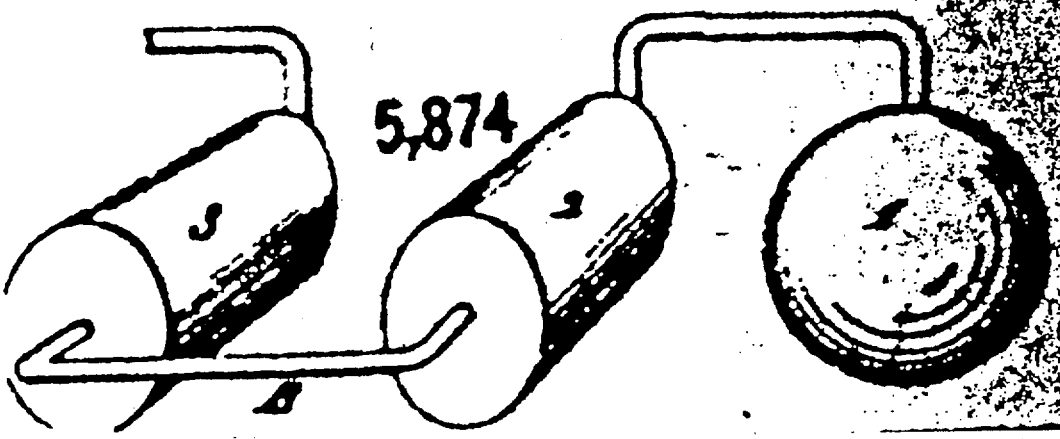

UNITED STATES PATENT OFFICE.

WILLIAM C. WREN AND WILLIAM BARKER, OF BROOKLYN, NEW YORK; SAID BARKER ASSIGNOR, BY MESNE ASSIGNMENTS, TO SAID WREN.

IMPROVEMENT IN APPARATUS FOR THE MANUFACTURE OF GAS FROM PETROLEUM.

Specification forming part of Letters Patent No. 56,843, dated July 31, 1866; reissue No. 5,874, dated May 12, 1874; application filed May 6, 1874.

DIVISION B.

*To all whom it may concern:*

Be it known that I, WILLIAM C. WREN, of the city of Brooklyn, county of Kings and State of New York, in connection with one WILLIAM BARKER, of the same place, did invent an Improvement in Apparatus for Making Illuminating-Gas, of which the following is a specification:

Said apparatus is especially valuable in the manufacture of gas from crude petroleum and similar hydrocarbons.

Prior to this invention certain properties of these hydrocarbons had been known, and among them were these, viz., that they could be converted into vapor by the application of heat sufficient to raise them a few hundred degrees in temperature, and that this vapor, if cooled, would condense into a refined product; but the vapor, if subjected to a heat sufficient to heat iron to a red heat, would be converted into a fixed gas, which would not readily condense, but was valuable for illuminating purposes. Various attempts had been made to utilize these properties of the hydrocarbons by apparatus in the nature of a stove or furnace, in one portion of which the vessel containing the hydrocarbon for vaporizing was placed, while the vapor was conducted to a chamber situated in a position to receive a more intense heat from the same fire, or the same end was sought by inclosing the vaporizer inside of the retort, so as to make the heat which reached the former the requisite amount below the heat applied to the latter; but with such apparatus it was impossible to maintain the relative degrees of temperature with a volume of vapor whose temperature was several hundred degrees lower than that of the superheater constantly flowing into the latter, and the result was an imperfect and incomplete conversion of the vapor into gas. Experiments were also made with the lighter hydrocarbons in apparatus which warmed the liquid to a degree of volatility, and then provided for a current of steam or air to pass through the vapor-chamber and to the retort charged with the volatile vapor. Such attempts, however, were never sufficiently practical to come into use, or to provide gas at a remunerative price.

The first part of this invention consists in the provision of apparatus with a distinctly regulatable application of heat for converting the vapor into fixed gas, by which the temperature of the retort or superheater can be increased or varied without affecting the temperature of the vaporizer or still, the latter being so heated as to evolve and drive over its contents, in the form of vapor, into the retort, without the aid of currents of air or mixing with steam. The second part of the invention consists in apparatus designed to prevent the imperfect conversion of the vapor into gas, and the wasting of any unconverted vapor through cooling of a retort.

The apparatus which is here referred to is shown in the annexed drawing, in which 1 is the vaporizing-chamber used to contain the petroleum or other material from which the vapor is to be generated, and which is exposed to a fire or other suitable heat, which is sufficient to vaporize the contents, as described. A is a pipe, by which the vapor passes to a separate chamber or vessel, 2, which is heated by a more intense heat, being exposed to a fire which does not come in contact with the vaporizer 1. This last-named heater 2 is kept at a much greater and steadier heat than the chamber 1, and in it the process of conversion of gas into vapor commences. This superheater 2 is connected with another retort, 3, by a pipe, B, through which the vapor or gas can readily pass, and the retort 3 is likewise heated by a steady fire which does not come in contact with the vaporizer 1. Other superheaters or retorts similarly connected and heated may be added, the number depending on the amount of gas required and the rapidity with which it is to be furnished. This connecting together of two or more superheaters or retorts is of great benefit, for it greatly enhances the perfect production of gas. A volume of vapor at a comparatively low temperature, coming continuously in contact with a more highly-heated surface, must of necessity cool the latter, and the latter surface, for the proper evolution of gas, must be kept constantly (if of iron) at about a red heat. If a single retort were heated to a much higher than a red heat, to allow for the subsequent cooling by vapor, a destructive decomposition of the gas would ensue, which would render it valueless.

The apparatus above described, therefore, acts as follows, viz: The superheater 2 commences the decomposition of the vapor into gas, and raises the temperature of the successive portions of vapor, so that the retort or chamber 3 is not cooled below a red heat, and the requisite heat for proper decomposition or "fixing" of the vapor is always to be found somewhere in the series of connected superheaters, which transforms all the vapor into gas, and acts on whatever has passed by the first superheater only warmed, but not decomposed. From the last of the retorts the gas emerges by a pipe, C, and passes in the usual manner to the receiver or gasometer for use.

By this apparatus a practical and successful means is afforded for producing from petroleum and kindred substances a gas of far greater illuminating power than ordinary coal-gas, and at a less cost than ordinary coal-gas had been made at the time of my invention.

I do not claim, broadly, all apparatus for making gas from hydrocarbon which first vaporizes the material and then decomposes the vapor; but What I do claim as new, and desire to secure by Letters Patent, is—

1. In apparatus for the manufacture of gas, the combination of a hydrocarbon-still adapted to vaporize and evolve its contents by heat, as described, with a superheater or retort heated by a fire separate from the heater which causes the vaporization and evolution, substantially as and for the purposes described.

2. In apparatus for the manufacture of gas, the combination of a heater or vaporizer with a series of two or more continuously-connected superheaters or retorts, substantially as and for the purposes described.

3. In apparatus for the manufacture of gas, the combination of a heater for vaporizing gas with a series of two or more connected superheaters for fixing the vapor—*i. e.*, decomposing it into fixed gas—substantially as described, said superheaters being heated by a fire separate from the heat which is applied to the vaporizer.

4. In apparatus for the manufacture of gas, the combination of two or more connected superheaters or retorts, the first of which raises the temperature of the vapor, and the succeeding ones complete the transformation thereof into fixed gas, substantially as described.

WILLIAM C. WREN.

Witnesses:
F. W. HANAFORD,
HENRY ENTENSA.